United States Patent [19]

Matsukawa

[11] Patent Number: 5,757,905
[45] Date of Patent: May 26, 1998

[54] TELEPHONE SET WITH CIRCUIT FOR SUPPRESSION OF HOWLING AND ECHO

[75] Inventor: Takanari Matsukawa, Tokyo, Japan

[73] Assignee: NEC Corporation, Japan

[21] Appl. No.: 568,983

[22] Filed: Dec. 7, 1995

[30] Foreign Application Priority Data

Dec. 7, 1994 [JP] Japan .................. 6-303574

[51] Int. Cl.$^6$ .................................................. H04M 1/00
[52] U.S. Cl. .................. 379/387; 379/389; 379/395; 379/390
[58] Field of Search .................. 379/387, 388, 379/389, 390, 391, 392, 406, 409; 381/92, 93, 95, 96

[56] References Cited

U.S. PATENT DOCUMENTS

| | | | |
|---|---|---|---|
| 3,925,618 | 12/1975 | Kato et al. | 379/389 |
| 4,491,689 | 1/1985 | Boeckman | 379/395 |
| 4,571,461 | 2/1986 | Uno et al. | 379/390 |
| 4,641,339 | 2/1987 | Stottlemyer | 379/391 |
| 4,747,132 | 5/1988 | Ibaraki et al. | 379/390 |
| 4,748,663 | 5/1988 | Phillips et al. | 379/388 |
| 4,955,055 | 9/1990 | Fujisaki et al. | 379/390 |
| 4,991,167 | 2/1991 | Petri et al. | 379/410 X |
| 5,271,057 | 12/1993 | Addeo et al. | 379/390 X |
| 5,526,419 | 6/1996 | Allen et al. | 379/391 X |
| 5,533,120 | 7/1996 | Staudacher | 379/390 X |

FOREIGN PATENT DOCUMENTS

| | | |
|---|---|---|
| 63-208341 | 8/1988 | Japan . |
| 1-253353 | 10/1989 | Japan . |
| 2156185 | 10/1985 | United Kingdom . |
| 2225517 | 5/1990 | United Kingdom . |

*Primary Examiner*—Jack Chiang
*Attorney, Agent, or Firm*—Ostrolenk, Faber, Gerb & Soffen, LLP

[57] ABSTRACT

A telephone set has a receiver for transducing a reception signal into a voice, a microphone for transducing a voice into a transmission signal and a comparing device. The comparing device compares the reception signal and the transmission signal, and a predetermined frequency pass band is in turn alternated according to a period of a first clock input to pass the reception signal and the transmission signal. The comparing device outputs a frequency pass band where the reception signal and transmission signal have a substantially equal and maximum level and a comparison result signal when the reception signal and transmission signal have the substantially equal level. The telephone set also includes a frequency indicator which generates a second clock with a period corresponding to the frequency pass band value signal as well as supplying the first clock to the comparing device, and a transmission signal controller which transmits the transmission signal to a transmission line, and a frequency band to be eliminated from the transmission signal is variably set on the basis of the second clock.

5 Claims, 5 Drawing Sheets

TELEPHONE SET WITH CIRCUIT FOR SUPPRESSION OF HOWLING AND ECHO

FIELD OF THE INVENTION

This invention relates to a telephone set, and more particularly to, a telephone set which is provided with means for suppressing howling and echo.

BACKGROUND OF THE INVENTION

A conventional telephone set comprises a receiver for the electrical-acoustical transducing of a reception signal received from a transmission line to generate a voice, and a microphone for the acoustical-electrical transducing of a voice to output a voice signal. In general, the receiver and microphone are commonly encased in a frame.

Recently, along with the miniaturization of a telephone set, the distance between a receiver and a microphone becomes short. Therefore, the acoustical connection of the receiver and the microphone trends to be increased, which may cause howling or echo by being affected the condition on a telephone line.

To overcome the problem, various telephone sets which are provided with means for suppressing the howling and echo are suggested.

Japanese patent application laid-open No.63-208341 discloses a telephone set which comprises a transmitter circuit for amplifying the output of a microphone and outputting it to a telephone line, a receiver circuit for amplifying an input received from the telephone line and outputting it to a speaker, wherein each of the transmitter and receiver circuits is provided with a variable loss element, and a control circuit in which a high and low loss conditions in the variable loss element are alternated by a frequency higher than a voice frequency.

Japanese patent application laid-open No.1-253353 discloses a telephone set which comprises an electronic volume controller and computer which can set a transmission priority mode in which a reception signal is attenuated and a reception priority mode in which a transmitting signal is attenuated, wherein the transmission priority mode may be selected when a non-signal state on both transmission and reception lines continues.

However, in the former of the above conventional telephone sets, the loop gain of a closed circuit formed by a leak signal passing from the speaker to the microphone can be kept less than one to avoid howling, but the level of a transmitting signal must be reduced. On the other hand, the latter of the conventional telephone sets is concerned with only a hands-free telephone set which uses a microphone and speaker, wherein unnecessary mode changes caused by a noise from the surrounding are suppressed by selecting the transmission priority mode when the non-signal state continues. Thus, it can not be adapted to the two-way simultaneous communication.

Furthermore, in the conventional telephone sets, a voice from the receiver may be reflected on the surface of a desk to be passed to the microphone, thereby increasing the acoustical connection to cause the howling and echo when the handset of the telephone set is placed on the desk in the midst of a telephone call.

SUMMARY OF THE INVENTION

Accordingly, it is an object of the invention to provide a telephone set which can suppress the howling and echo with securing the two-way simultaneous communication.

According to the invention, a telephone set, comprises:

a receiver for transducing a reception signal into a voice;

a microphone for transducing a voice into a transmission signal;

means for comparing the reception signal and the transmission signal, wherein a predetermined frequency pass band is in turn alternated according to a period of a first clock input externally to pass the reception signal and the transmission signal, the comparing means outputting a frequency pass band value signal corresponding to a frequency pass band where the reception signal and transmission signal have a substantially equal and maximum level and a comparison result signal when the reception signal and transmission signal have the substantially equal level;

a frequency indicator for generating a second clock with a period corresponding to the frequency pass band value signal as well as supplying the first clock to the comparing means;

and a transmission signal controller for transmitting the transmission signal to a transmission line, wherein a frequency band to be eliminated from the transmission signal is variably set on the basis of the second clock.

Namely, when the comparing means detects a frequency pass band where the reception signal and transmission signal include the substantially equal waveform level, the transmission signal controller decides that the transmission signal is passing from the receiver to the microphone, and it then controls to eliminate a frequency pass band in which they have the substantially equal and maximum waveform level from the transmission signal and to output the controlled transmission signal to the transmission line.

Thus, since the transmission signal is transmitted to the other party in such state that a frequency pass band corresponding to the maximum waveform level is eliminated from the transmission signal passing from the receiver, the two-way simultaneous communication can be provided as usual, and the howling and echo can be suppressed without reducing the level of the transmission signal except a particular frequency band.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
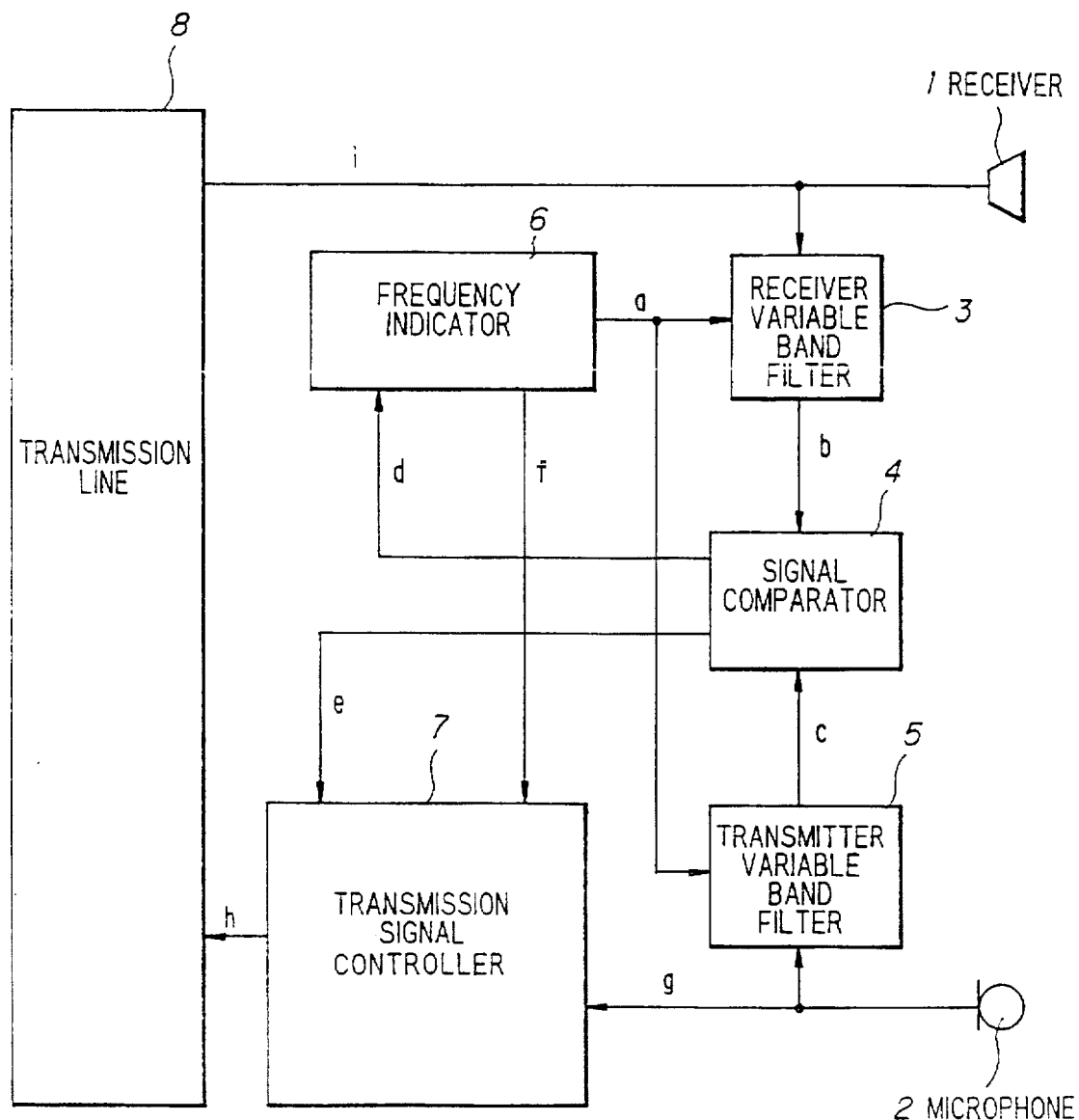
FIG. 1 is a schematic block diagram showing a telephone set in a preferred embodiment according to the invention.

A telephone set in the preferred embodiment will be explained in FIGS. 1 to 6. As shown in FIG. 1, the telephone set includes a receiver 1, a microphone 2, receiver variable band filter 3, a signal comparator 4, a transmitter variable band filter 5, a frequency indicator 6 and a transmission signal controller 7.

Each of the receiver variable band filter 3 and transmitter variable band filter 5 has a switched capacitor filter(band filter). A frequency pass band in the switched capacitor filters is changed according as the period of a first clock 'a' from the frequency indicator 6 is changed. At this time, the receiver variable band filter 3 and transmitter variable band filter 5 output information signals 'b' and 'c', respectively, which include information as to a waveform level and a value of the frequency pass band in the respective frequency pass bands.

Figure 2:
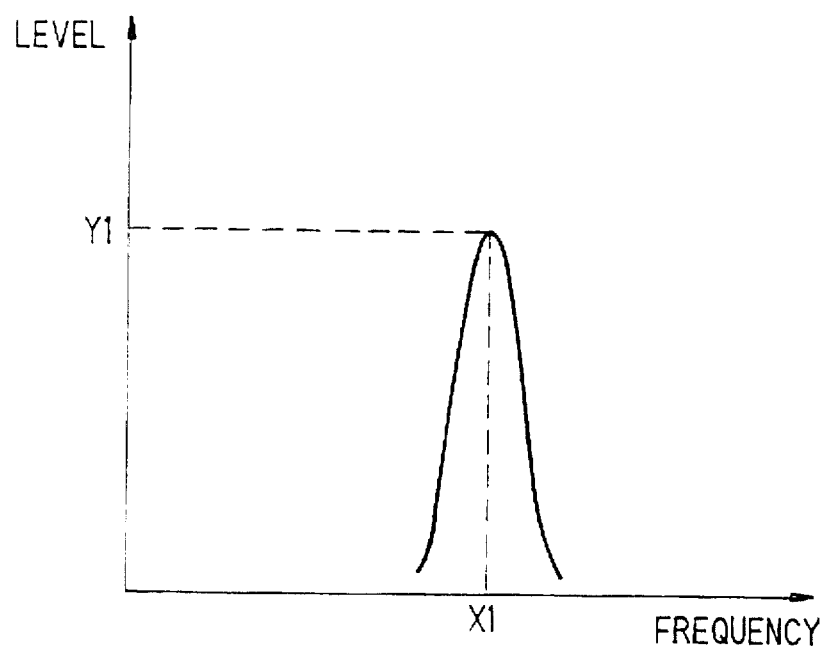
FIG. 2 is a graph showing a frequency spectrum output from a receiver variable band filter 3 in FIG. 1.
Figure 3:
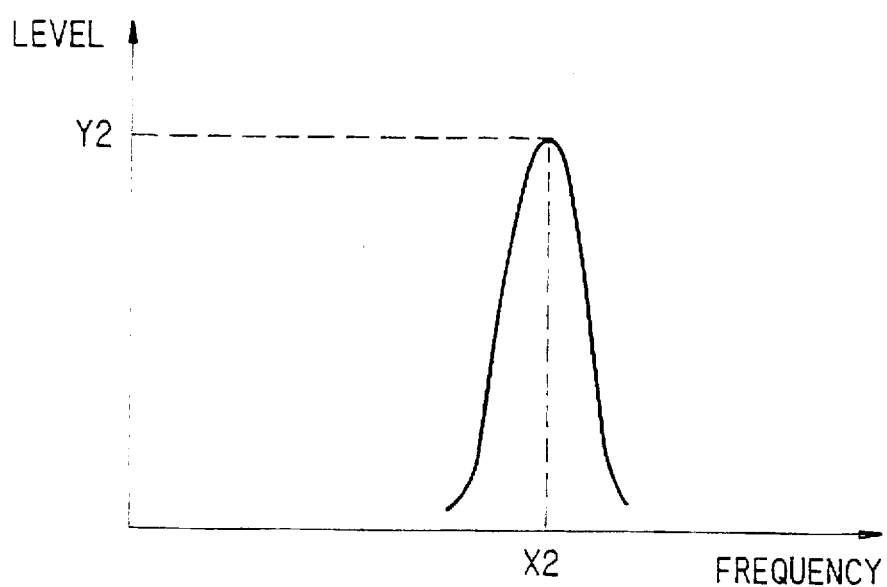
FIG. 3 is a graph showing a frequency spectrum output from a transmitter variable band filter 5 in FIG. 1.

FIG. 2 shows an example of a frequency spectrum in the output information signal 'b' from the receiver variable band filter 3, where X1 means the central frequency of the frequency pass band and Y1 means the level at the central frequency. As explained above, frequency pass bands to the total number of N, each of which has the central frequency X1, are alternated according to the period of the clock 'a'. Similarly, FIG. 3 shows a frequency spectrum in the output information signal 'c' from the transmitter variable band filter 5, where X2 means the central frequency of the frequency pass band and Y2 meas the level at the central frequency. Also, frequency pass bands to the total number of N, each of which has the central frequency X2, are alternated according to the period of the clock 'a'.

Figure 4:
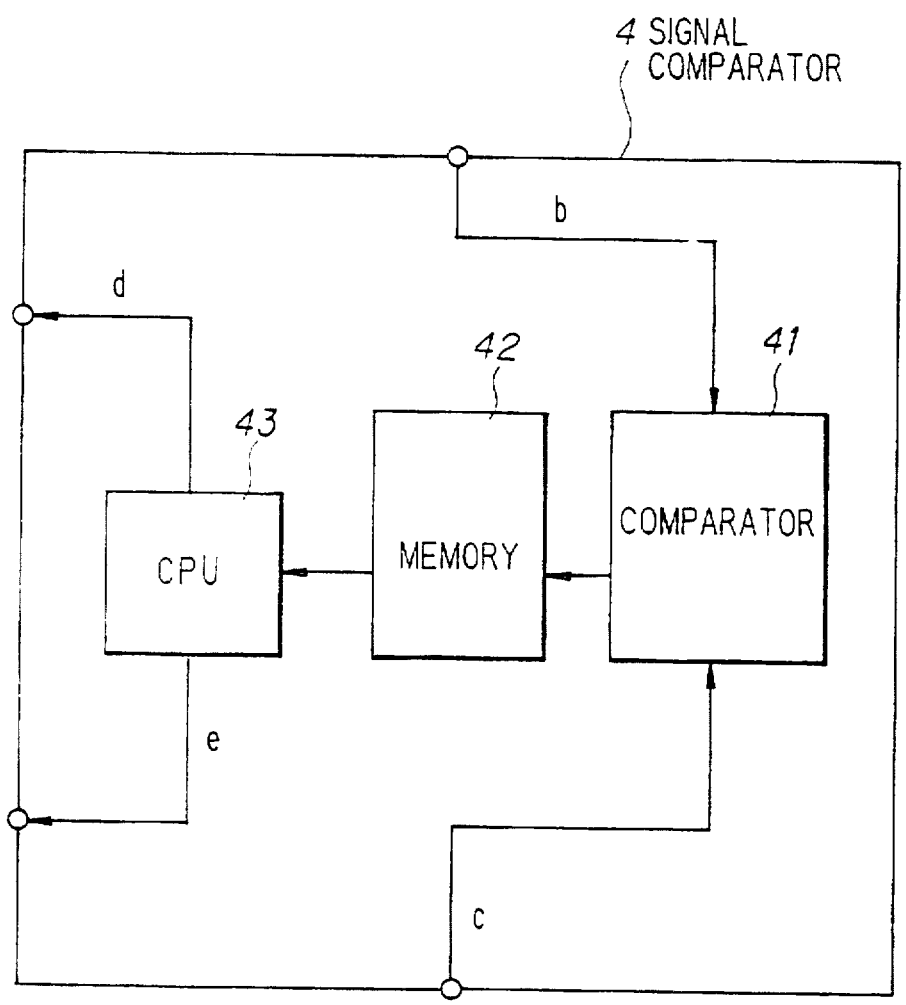
FIG. 4 is a block diagram showing a signal comparator 4 in FIG. 1.

The signal comparator 4 compares the information signals 'b' and 'c' and then outputs a comparison result signal 'e' to the transmission signal controller 7 as well as outputting a frequency pass band signal 'd' to the frequency indicator 6. As shown in FIG. 4, the signal comparator 4 includes a comparator 41 for comparing the levels of information signals 'b' and 'c', a memory 42 in which the output of the comparator 41 is input, and CPU 43 in which the read-out data from the memory 42 is input.

Figure 5:
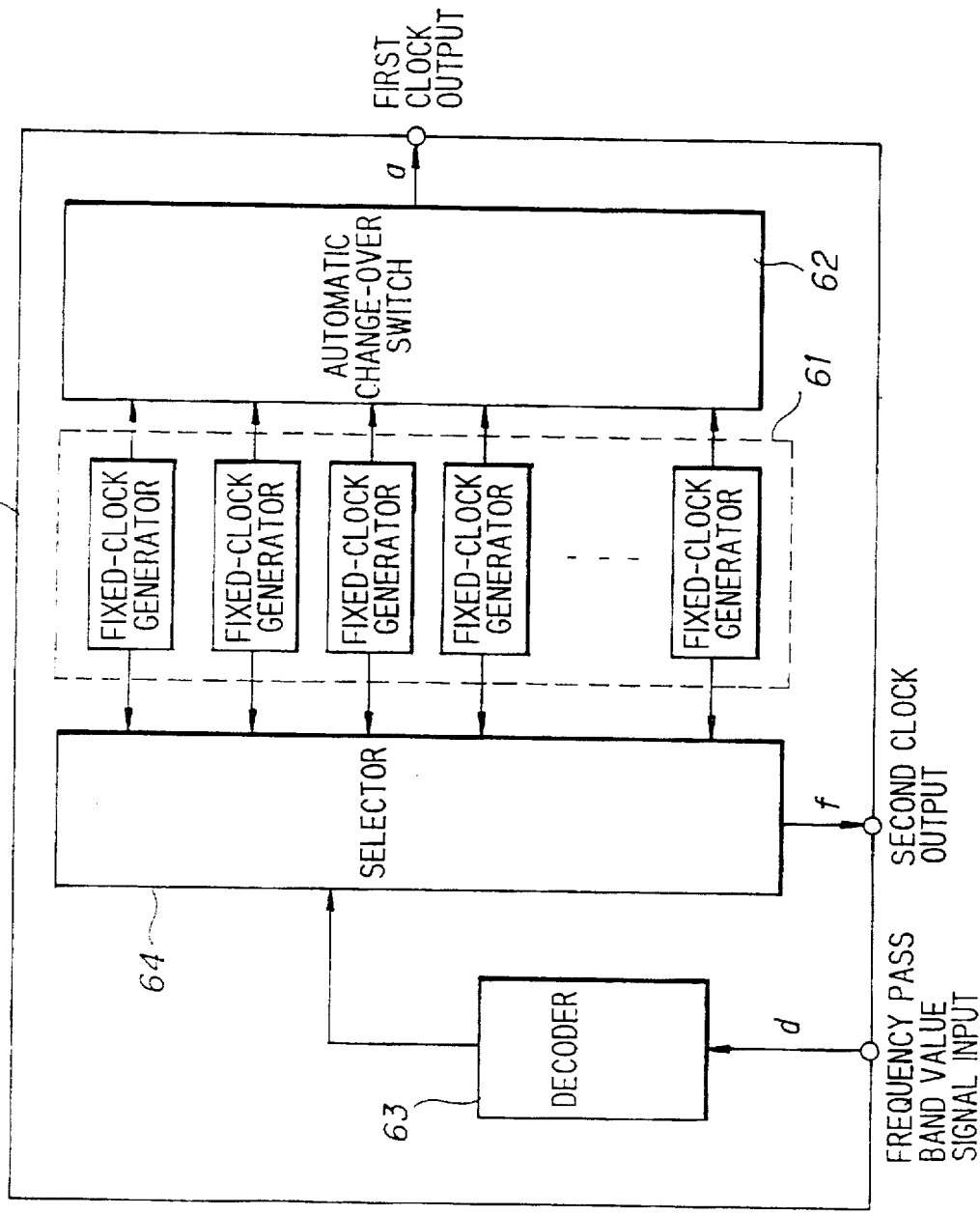
FIG. 5 is a block diagram showing a frequency indicator 6 in FIG. 1.

The frequency indicator 6 includes, as shown in FIG. 5, fixed-clock generators 61, of a number N fixed-clock generators, which generate and output clocks of different periods, an automatic change-over switch 62 in which the respective clocks are cyclically alternated at a constant time interval and then are output as the clock 'a', a decoder 63 to which the signal 'd' to a frequency pass band value is input and which identifies the frequency pass band value and outputs a selection signal, and a selector 64 in which a necessary clock of the clocks input from the fixed-clock generators 61 is selected and is output as a second clock 'f'.

Figure 6:
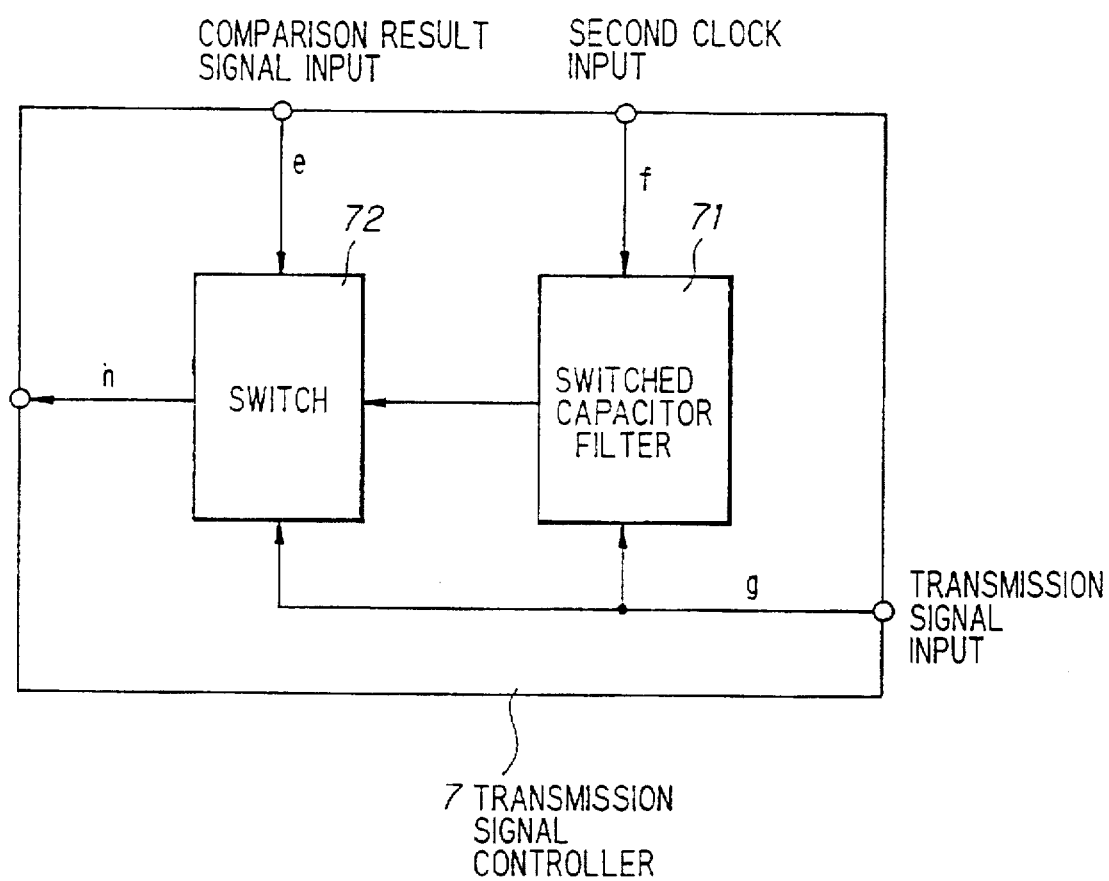
FIG. 6 is a block diagram showing a transmission signal controller 7 in FIG. 1.

The transmission signal controller 7 includes, as shown in FIG. 6, a switched capacitor filter 71 and a switch 72. The switched capacitor filter 71 is a band-elimination filter(BEF) and eliminates a frequency band corresponding to the period of the second clock 'f' from a transmission signal 'g' and then outputs the transmission signal 'g' to the switch 72. The switch 72 inputs the output signal from the switched capacitor filter 71 and the transmission signal 'g' and then selects one of them according to the comparison result signal 'e' to output it to the transmission line 8 shown in FIG. 1 as a controlled transmission signal 'h'.

In operation, a voice signal transmitted from the other party is supplied to the receiver 1 through the transmission line 8 as a reception signal to be subject to the electricalacoustical transducing to generate a voice, and a narrow frequency band component of the voice signal is filtered by the receiver variable band filter 3 to output to the signal comparator 4 as an information signal 'b'.

On the other hand, operator's voice is input to the microphone 2 in which it is transduced into a transmission signal 'g' of an electrical signal. However, the voice generated from the receiver 1 may be also passed to the microphone 2, for example, when the microphone 2 is placed on a desk in the midst of a telephone call. Therefore, such voice can be also output as a transmission signal 'g' from the microphone 2.

The transmission signal 'g' is supplied to the transmitter variable band filter 5, being filtered to obtain a narrow frequency band component and then being output to the signal comparator 4 as an information signal 'c' as well as being directly output to the transmission signal controller 7. Herein, the receiver variable band filter 3 and transmitter variable band filter 5 have a common frequency pass band due to the same clock 'a' and are controlled to alternate the frequency pass band. The comparator 41 in the signal comparator 4 compares the information signals 'b' and 'c'. If the waveform levels of them are substantially identical, then the waveform level and frequency pass band value are supplied to the memory 42 to memorize them.

After similar operations are conducted to all the frequency pass bands to the number of N, CPU 43 reads the data memorized in the memory 42 to determine the maximum waveform level. Then CPU 43 supplies the frequency indicator 6 with a signal 'd' to a frequency pass band value which indicates the frequency pass band value corresponding to the maximum waveform level. At the same time, CPU 43 supplies the transmission signal controller 7 with a comparison result signal 'e' as to whether or not there exists a substantially equal waveform level between the information signals 'b' and 'c'.

The frequency indicator 6 analyzes the signal 'd' to the frequency pass band value by the decoder 63 to select a clock 'f' with such period that the frequency band value will be obtained and supplies the clock 'f' to the switched capacitor filter 71 in the transmission signal controller 7 to control to have such band-elimination characteristic that a narrow frequency band with a central frequency corresponding to the frequency band value can be eliminated.

Thereafter, only in the case that the comparison result signal 'e' indicates that the information signals 'b' and 'c' include a substantially equal waveform level and it is detected that the waveform level in the information signals 'b' and 'c' is the maximum value, the switch 72 in the transmission signal controller 7 is controlled to select the output signal from the switched capacitor filter 71. In another case, the switch 72 is controlled to select the transmission signal 'g' input from the microphone 2.

Thus, when the information signals 'b' and 'c' do not include a substantially equal waveform level or the waveform level thereof is not the maximum value even if they include a substantially equal waveform level, the transmission signal controller 7 passes the transmission signal 'g' as it is and outputs it to the transmission line 8 as the controlled transmission signal 'h'.

Accordingly, when the information signals 'b' and 'c' include the substantially equal waveform level, it is decided by the transmission signal controller 7 that the transmission signal 'g' is passing from the receiver 1 to the microphone 2, and the switch 72 is controlled to select a transmission signal output from the switched capacitor filter .71 which is controlled to eliminate a frequency pass band in which the information signals 'b' and 'c' have the substantially equal and maximum waveform level from the transmission signal 'g'.

Namely, since the transmission signal 'h' is transmitted to the other party in such state that a frequency pass band corresponding to the maximum waveform level is eliminated from the transmission signal 'g' passing from the receiver 1, two-way simultaneous communication can be provided as usual, and the howling and echo can be suppressed without reducing the level of the transmission signal except a particular frequency band.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A telephone set, comprising:

a receiver for transducing a reception signal into a voice;

a microphone for transducing a voice into a transmission signal;

means for comparing said reception signal and said transmission signal, wherein a predetermined frequency pass band is in turn alternated according to a period of a first clock input externally to pass said reception signal and said transmission signal, said comparing means outputting a frequency pass band value signal corresponding to a frequency pass band where said reception signal and transmission signal have a substantially equal and maximum level and a comparison result signal when said reception signal and transmission signal have said substantially equal level;

a frequency indicator for generating a second clock with a period corresponding to said frequency pass band value signal as well as supplying said first clock to said comparing means; and a transmission signal controller for transmitting said transmission signal to a transmission line, wherein a frequency band to be eliminated from said transmission signal is variably set on the basis of said second clock.

2. A telephone set, according to claim 1, wherein said comparing means comprises:

a receiver variable band filter for passing said reception signal, said receiver variable band filter being variably set at said predetermined frequency pass band corresponding to said period of said first clock;

a transmitter variable band filter for passing said transmission signal, said transmitter variable band filter being variably set at said predetermined frequency pass band corresponding to said period of said first clock; and a signal comparator for comparing output levels of respective said reception and transmission signals at the same frequency pass band, said signal comparator memorizing a frequency pass band where said reception signal and transmission signal have a substantially equal level and outputting a frequency pass band value signal corresponding to said frequency pass band with a maximum of said substantially equal level and a comparison result signal.

3. A telephone set, according to claim 1, wherein said transmission signal controller comprises:

a variable band eliminating filter for selecting a frequency band to be eliminated from said transmission signal, to which said transmission signal from said microphone and said second clock are input, wherein said frequency band to be eliminated from said transmission signal is variably set on the basis of said second clock; and a switch for selecting a transmission signal from said variable band eliminating filter or said transmission signal from said microphone to output it to said transmission line, wherein said transmission signal from said variable band eliminating filter is selected when said comparison result signal is input, and said transmission signal from said microphone is selected when said comparison result signal is not input.

4. A telephone set, according to claim 1, wherein said frequency indicator comprises:

a plurality of fixed-clock generators for generating said first clock and second clock;

a decoder for identifying said frequency pass band which corresponds to said frequency pass band value signal; and a selector for selecting and outputting said second clock corresponding to said frequency pass band.

5. A telephone set, comprising:

a receiver transducing a recaption signal into a voice;

a microphone transducing a voice into a transmission signal;

a comparing device comparing said reception signal and said transmission signal, wherein a predetermined frequency pass band is in turn alternated according to a period of a first clock input externally to pass said reception signal and said transmission signal, said comparing device outputting a frequency pass band value signal corresponding to a frequency pass band where said reception signal and transmission signal have a substantially equal and maximum level and a comparison result signal when said reception signal and transmission signal have said substantially equal level;

a frequency indicator generating a second clock with a period corresponding to said frequency pass band value signal, as well as supplying said first clock to said comparing device; and a transmission signal controller transmitting said transmission signal to a transmission line, wherein a frequency band to be eliminated from said transmission signal is variably set on the basis of said second clock.

* * * * *